J. H. JONES.
Harvester Rake.
No. 53,450. Patented March 27, 1866.
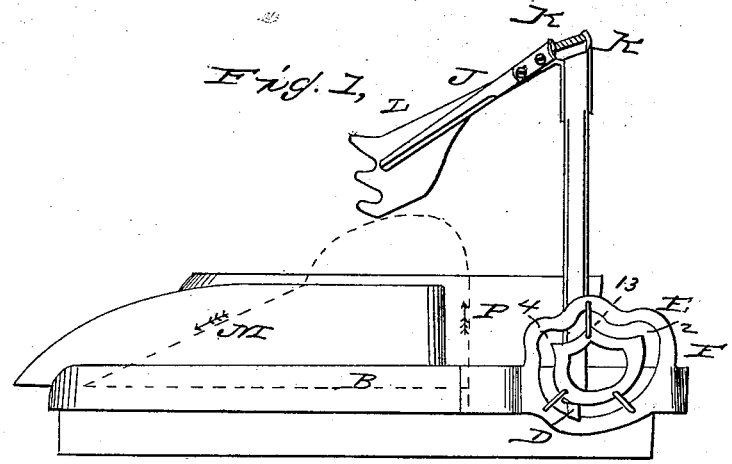
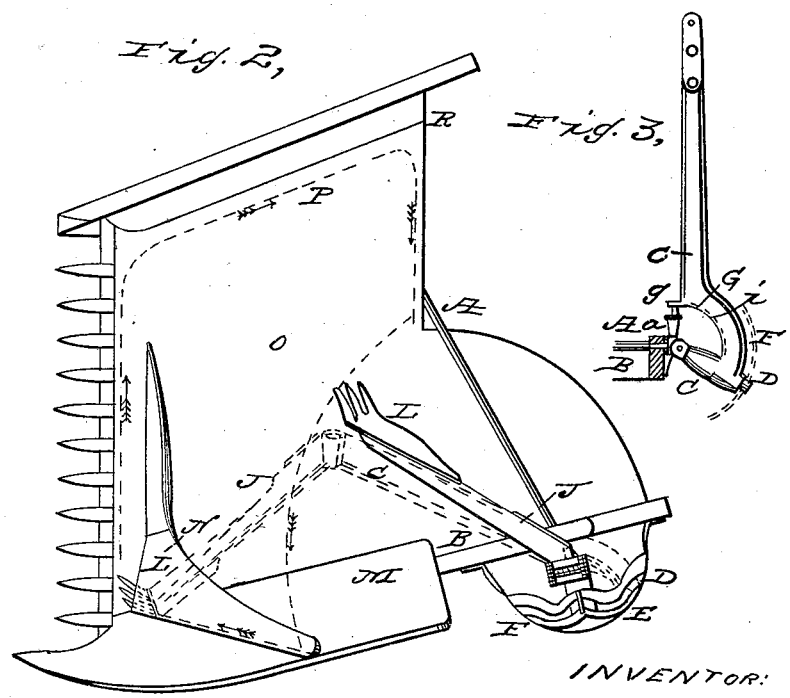
WITNESSES:
Jo. S. Peyton
Theodore Lang.
INVENTOR:
J. Henry Jones
by his Att'ys
Baldwin & Son

UNITED STATES PATENT OFFICE.

J. HERVA JONES, OF ROCKFORD, ILLINOIS.

IMPROVEMENT IN HARVESTER-RAKES.

Specification forming part of Letters Patent No. 53,450, dated March 27, 1866.

*To all whom it may concern:*

Be it known that I, J. HERVA JONES, of Rockford, in the county of Winnebago and State of Illinois, have invented a new and useful Improvement in Harvester-Rakes, of which the following is a full, clear, and exact description, reference being had to the accompanying drawings, which make part of this specification, and in which—

Figure 1 represents a view, in elevation, of so much of the grain side of a harvester with my improvement applied thereto as is necessary to illustrate my invention; Fig. 2, a plan view of the same, the black lines showing the rake in the same position as in Fig. 1 and the red lines its position when first thrust forward to sweep off the cut grain; and Fig 3, a view of the details of the socket-lever and its connections.

It is the object of my invention automatically to discharge cut grain from a harvester in compact gavels and out of the track of the team in cutting the next swath in a way similar to that practiced in hand-raking; and to these ends my improvement consists, first, in mounting the rake-head on an arm jointed to a rocking and turning post mounted on the grain side of the frame or platform and having its movements controlled by a cam-groove, as hereinafter described, whereby I cause the rake to traverse parallel to the finger-beam and wing-board to discharge the gavel with a very slight angular movement, and then to rise and turn to pass above the rear and grain sides of the platform; second, in combining with the platform and divider a gathering-board inclined from the divider to the platform at an angle sufficient to cause the grain which falls upon it to slide down upon the platform, and over and down which the rake-head slides in its forward movement, whereby I am enabled more perfectly to discharge the grain; third, in driving an automatic rake located on the grain side of the platform by means of a shaft passing under the platform on the gearing side and over it on the grain side, whereby I get a simple direct connection with the motive power without interfering with the discharge of the gavel; fourth, in extending the driving-shaft of the rake beyond the grain side of the frame and combining therewith a rolling and traversing joint, upon which the rake-post is mounted, whereby I attain freedom and eccentricity of movement with comparatively little friction; fifth, in mounting the rake-post on a swiveling-socket, and also causing it to rotate and slide on a fixed fulcrum, whereby the relation of the rake and fulcrum varies during different portions of the stroke without affecting their freedom of movement; sixth, in mounting the rake on a swiveling-joint controlled by a hemispherical cam-groove secured upon the grain side of the frame, the coupling of the driving-shaft forming the center of the cam-groove and of the moving joint; seventh, in combining the sliding socket and fulcrum-pin, as hereinafter described; eighth, in attaching the rake-arm to the rake-post at an acute angle, in order that the rake may enter the grain at a point outside of the end of the cutters.

In the accompanying drawings, which exemplify one method of carrying out the objects of my invention, a driving-shaft, A, is shown as extending across the platform from the gearing to the grain side. The gearing end of this shaft lies under the platform and the other above it, as shown in Fig. 2, thus enabling the gavel to be discharged without obstruction from the shaft. The driving-shaft extends beyond the main side timber, B, of the frame, and is connected to the rake-post C by means of a universal joint, *a*. The lower end of the rake-post is arch-shaped and provided with a cross-head, *c*, set in the same plane as the post, but at an angle of about forty-five degrees to it. The cross-head plays loosely on a rod connected to the universal joint *a*, and having on its outer end a friction-roller, D, which traverses in a heart-shaped cam-groove, E, cut in a hemispherical shell, F, bolted to the frame, and so arranged that the universal joint *a* forms its center. A fulcrum-pin, G, is secured upon the frame over the universal joint, and provided with a swinging arm or guide, *g*, which enters a guide-slot, *i*, in the concave side of the arch of the rake-post, as shown by the dotted lines in Fig. 3, and is free to play horizontally on the fulcrum-pin. A rake-arm, J, is connected to the rake post by a joint, K, which permits vertical play only, and which is provided with a spring, *k*, to hold the rake down upon the platform. It will be observed that the rake-post and stale are not united squarely, but at an acute angle, for the purpose of causing the rake to pass outside of the grain when it first descends upon the platform. A rake, L, is attached to the arm J with its teeth projecting in a manner somewhat analogous to the fingers of the human hand. The divider M inclines toward the platform O, to the outer edge of which it is united. Between the two I place a ring-board, N, inclined forward and inward, so as to make the grain which falls upon it slide inward upon the platform.

I have here described only those parts of the machine necessary to illustrate my invention; but it will, of course, be understood that the operation is described as that of a complete harvesting-machine.

Suppose the rake to be in the attitude shown in black in Figs. 1 and 2. The machine being put in motion, the rotation of the driving-shaft A will cause the friction-roller D to traverse the lower part of the cam-groove E from front to rear, or from the point 1 to 2. As the roller rises in the cam-groove the rake-post is simultaneously turned and depressed, its slot $i$ enabling it to slide over the fulcrum-pin $g$, as shown in red in Fig. 2, while the rake-head, after passing outside the perpendicular of the frame, descends inward upon the platform, passing under and sweeping down any grain lodged upon the divider or wing-board. The red lines in Fig. 2 show the position of the rake at this moment, the roller resting at the point 2. As the friction-roller moves forward from 2 to 3 the rake traverses the platform parallel to the finger-beam, sweeping the cut grain before it and compressing it into a compact gavel against the grain-board P. The roller then passes the highest point 3 of the cam-groove and begins to descend, while the rake moves backward parallel to the guard-board P and discharges the gavel at the point R, where it is out of the path of the horses in cutting the succeeding swath. The blue dotted lines show the course of the rake. As the roller descends from 4 to 5 the rake is lifted above the back of the platform and turned, its teeth moving to the front, ready to be thrust forward for another stroke.

What I claim as my invention, and desire to secure by Letters Patent, is—

1. The combination of the turning and oscillating rake-post with the cam-groove located upon the grain side of the main frame, when constructed, arranged, and operating substantially in the manner described, for the purposes set forth.

2. The combination of the platform, the divider, and the wing-board with the rake, substantially as and for the purpose described.

3. The arrangement of the platform, the driving-shaft, and the rake, substantially for the purpose set forth.

4. The combination of the driving-shaft, the swiveling-socket, the cam-groove, and the rake, when arranged for joint operation substantially as described.

5. The combination of a rake-post with a swiveling-socket and a sliding fulcrum, substantially as and for the purpose described.

6. The combination of the driving-shaft, the swiveling-socket, and the hemispherical cam-groove, arranged and operating as described.

7. The combination of the rake-post, fulcrum-pin, and guide-socket, as and for the purpose described.

8. Uniting the rake post and arm, when located, as described, at an acute angle, substantially as described, for the purpose set forth.

In testimony whereof I have hereunto subscribed my name.

J. HERVA JONES.

Witnesses:
   J. P. IRWIN,
   R. WOOD.